United States Patent [19]

Suzuki et al.

[11] 4,343,197

[45] Aug. 10, 1982

[54] LOAD-CELL BALANCE

[75] Inventors: Seiji Suzuki; Kohichiro Sakamoto; Tohru Kitagawa, all of Shizuoka, Japan

[73] Assignee: Tokyo Electric Co., Ltd., Tokyo, Japan

[21] Appl. No.: 139,645

[22] Filed: Apr. 14, 1980

[30] Foreign Application Priority Data

Apr. 19, 1979 [JP] Japan ................................. 54-47242

[51] Int. Cl.³ ............................................... G01L 1/22
[52] U.S. Cl. .................................. 73/862.65; 73/855; 338/2
[58] Field of Search ................................. 73/774–777, 73/768, 855, 862.65; 338/2, 5

[56] References Cited

U.S. PATENT DOCUMENTS

| 3,089,107 | 5/1963 | Dean | 338/2 |
|---|---|---|---|
| 3,599,139 | 8/1971 | Low | 338/2 |
| 3,639,875 | 2/1972 | Brewer | 338/2 |
| 3,828,295 | 8/1974 | Bradley | 338/6 |
| 3,863,192 | 1/1975 | Grey | 338/2 |
| 3,940,730 | 2/1976 | Brewer | 338/2 |
| 4,212,197 | 7/1980 | Kawai et al. | 338/5 X |

Primary Examiner—Charles A. Ruehl
Attorney, Agent, or Firm—Oblon, Fisher, Spivak, McClelland & Maier

[57] ABSTRACT

A load-cell balance having a parallelogram load cell body constituted by a stationary column, movable column and two arms connected between these columns, each arm having thin-walled flexible portions to which adhered are strain gauges. Each strain gauge is coated and sealed by a coating made of a material of butyl rubber group so as to be protected against moisture. The coating permits a free deflection of deflectable parts of the balance, even when the load is small, while maintaining a good moisture proof nature, so that the reliability of the balance is much enhanced.

5 Claims, 13 Drawing Figures

LOAD-CELL BALANCE

BACKGROUND OF THE INVENTION

The present invention relates to a load-cell balance making use of strain gauges.

Generally, the load-cell balance of the kind described has a beam or frame provided with four thin-walled flexible portions adapted to be deflected by an application of a load and four strain gauges adhered to respective flexible portions, the strain gauges being connected in the form of a bridge so that the load is picked up as an electric signal. In order to check the influence of external conditions, it is necessary to take necessary measures to protect the strain gauge against moisture. This moisture-proofness is realized in various manners.

Firstly, it has been a practical measure to effect a seal by means of a metallic bellows or the like. This type of structure, however, impractically limits the usable shape of construction and is expensive, although it can provide a good seal against moisture.

Secondly, it has been adopted to form a coating with a moisture proof material such as silicon rubber. This structure, however, cannot provide a good sealing effect due to a poor sealing nature of the material.

The third way is to form a coating with a moisture proof sealant of the epoxy group. This sealant forms a good seal against the moisture but cannot be successfully used for a balance of small capacity, because the sealant is hardened to adversely affect the load-cell characteristic such as creep or hysteresis, resulting in a deteriorated precision of measurement.

SUMMARY OF THE INVENTION

It is, therefore, a first object of the invention to make sure of the sealing of strain gauges against moisture, while avoiding an influence on the measurement even in a load-cell balance for small load.

It is another object of the invention to improve the sealing characteristic of the coating material for coating the strain gauge, thereby to increase the adhesion to the load-cell body.

It is still another object of the invention to provide various means for coating of a strain gauge capable of ensuring the stability of operation of the strain gauge.

DESCRIPTION OF THE PREFERRED EMBODIMENTS

Figure 1:
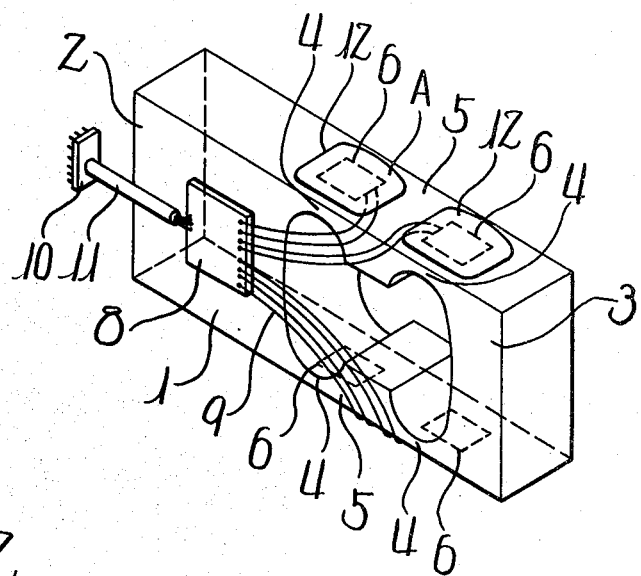
FIG. 1 is a perspective view of a first embodiment of the invention.
Figure 2:
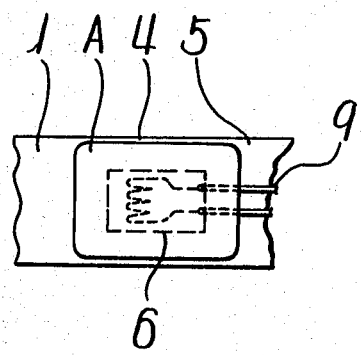
FIG. 2 is a plan view of the embodiment shown in FIG. 1.
Figure 3:
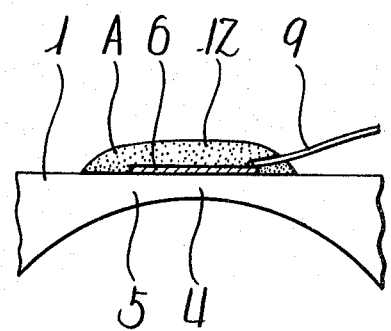
FIG. 3 is a longitudinal sectional view of the embodiment shown in FIG. 1.

A first embodiment of the invention will be described hereinunder with specific reference to FIGS. 1 to 3. A body 1 of load cell is formed by effecting a mechanical processing on the drawn material of aluminum alloys such as Duralmin. This load cell body is constituted by a stationary column 2, a movable column 3 supporting a load saucer (not shown) and two arms through which the stationary and movable columns 2,3 are connected to each other at their upper and lower ends. Each arm has thin-walled flexible portions 4 formed at both sides thereof. Strain gauges 6 are adhered to the outer sides of respective flexible portions 4, i.e. to the upper and lower sides of the upper and lower flexible portions 4. A printed circuit board 8 having a predetermined pattern is attached to the side surface of the stationary column 2. Lead wires 9 of the strain gauges 6 are connected to the printed circuit board 8. Also, a connection cord 11 is extended from the printed circuit board 8 so as to be connected to an electric circuit (not shown) through a connector.

Each strain gauge 6 is coated together with the flexible portion 4 by a weather strip 12 which constitutes the coating A. This weather strip sealer 12 is made of, for example, 366 deluxe (commercial name) manufactured and sold by Cemedyne Kabushiki Kaisha, having a composition constituted by 10% of butyl rubber, 10% of plasticizer, 50% of filler, 3 to 5% of adhesive and 25-27% of solvent. The weather strip sealer 12 can preserve its soft nature without exhibiting hardening, even after the application. Therefore, the flexible portion 4 is allowed to deflect freely without being affected by the coating. In addition, the coating can easily be formed by a simple application of this sealer. Further, this sealer 12 can provide a sure seal of the strain gauge 6, thanks to its good adhesion and moisture proof nature.

A second embodiment of the invention will be described hereinunder. Since this second embodiment has the same shape as the first embodiment, the explanation will be made with reference to the same FIGS. 1 and 2. In this embodiment, liquid of unvulcanized butyl rubber is used as the coating material. The liquid of this unvulcanized butyl rubber is applied to the upper surface of the strain gauge 6 and the associated flexible portion 4. Thereafter, curing is made in an atmosphere at 150° C. for 30 minutes. The vulcanized butyl rubber forms the coating A which provides, as in the case of the first embodiment, a sufficient mechanical and chemical protection for the strain gauge 6, and never affects the measuring precision. It is necessary to effect a primer treatment before the application of the unvulcanized butyl rubber liquid. This primer treatment is performed to obtain a better adhesion between the rubber and the metal, and is typically achieved by an application of an intersurface adhesive. This primer treatment is effected also on the strain guage 6 and the lead wire 9.

Figure 4:
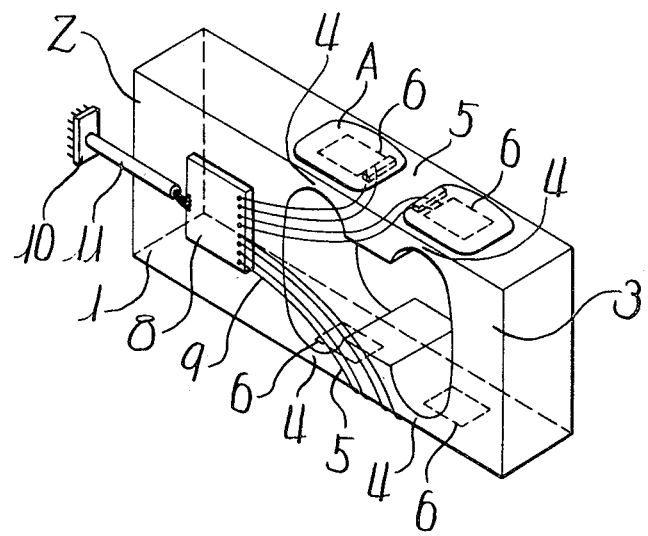
FIG. 4 is a perspective view of a third embodiment of the invention.
Figure 5:
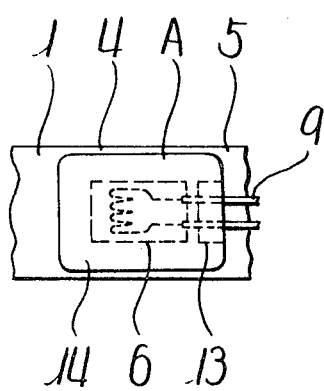
FIG. 5 is a plan view of a part of the third embodiment shown in FIG. 4.
Figure 6:
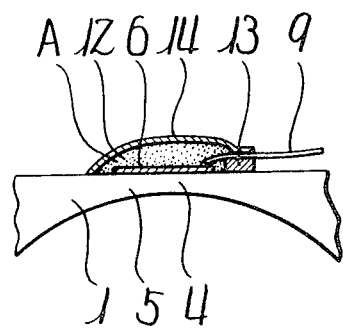
FIG. 6 is a longitudinal sectional view of the third embodiment shown in FIG. 4.

FIGS. 4 to 6 show a third embodiment of the invention in which same parts or members as those of the preceding embodiments are designated at the same reference numerals and detailed description thereof are omitted. According to this embodiment, a spacer 13 made of a material of the same group as butyl rubber is provided in the lead direction of the lead wire 9 for the strain gauge 6. The spacer 13 is held in contact with the flexible portion 4, and the lead wire 9 is placed on the spacer 13. Then, a coating is formed with a weather strip sealer 12 which in turn is coated with a thin butyl rubber sheet 14 having a thickness of 0.1 to 1.0 mm, thus completing the coating A. A good electrical insulation is preserved between the lead wire 9 and the flexible portion 4, thanks to the spacer 13 placed therebetween, so that this embodiment ensures a high safety of operation.

A fourth embodiment will be described hereinunder. This embodiment has a construction same as that shown in FIGS. 4 to 6. In this embodiment, liquid of unvulcanized butyl rubber is used in place of the weather strip sealer 12 of the third embodiment. The coating A is formed by heating and vulcanizing the unvulcanized butyl rubber liquid.

Figure 7:
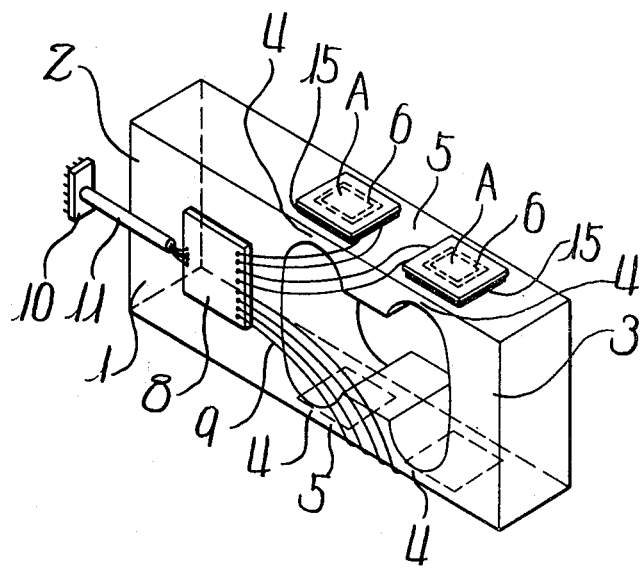
FIG. 7 is a perspective view of a fifth embodiment of the invention.
Figure 8:
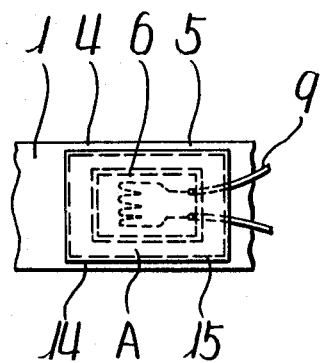
FIG. 8 is a plan view of a part of the fifth embodiment shown in FIG. 7.
Figure 9:
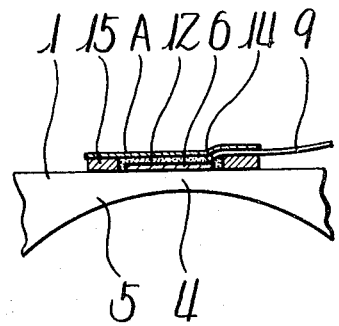
FIG. 9 is a longitudinal sectional view of the fifth embodiment shown in FIG. 5.

A fifth embodiment of the invention will be described hereinunder with reference to FIGS. 7–9. According to this embodiment, a frame-like butyl rubber sheet 15 surrounding the strain gauge is adhered after a primer treatment. Then, using a weather strp sealer 12 as the adhesive of the rubber group, a thin butyl rubber sheet 14 having an outer periphery substantially conforming that of the butyl rubber sheet 15 is superposed and adhered to the latter, thereby to form a coating A.

It is possible to use liquid of unvulcanized butyl rubber in place of the weather strip sealer 12. In this case, needless to say, it is necessary to take an additional step of pressurizing and heating for the vulcanization of the liquid rubber. This arrangement further enhances the protection against moisture because it is free of pinholes. In addition, the pressurizing can be effected uniformly thanks to the presence of the frame-like butyl rubber sheet 15.

Figure 10:
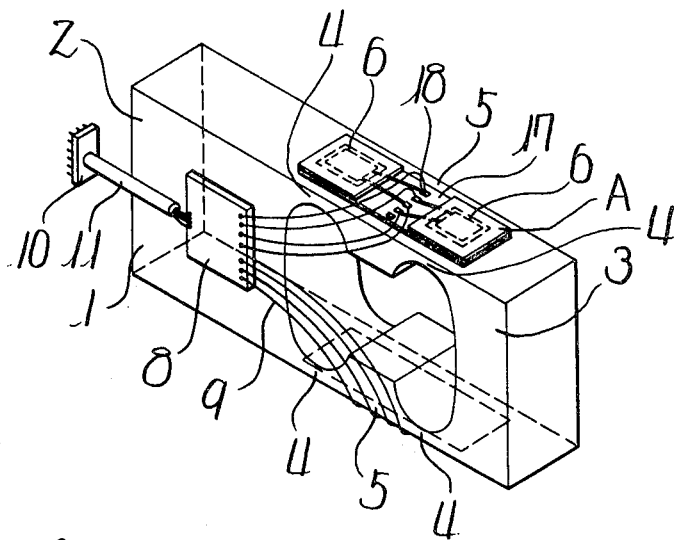
FIG. 10 is a perspective view of a sixth embodiment of the invention.
Figure 11:
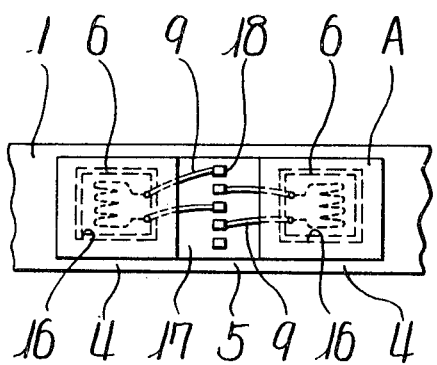
FIG. 11 is a plan view of a part of the sixth embodiment shown in FIG. 10.
Figure 12:
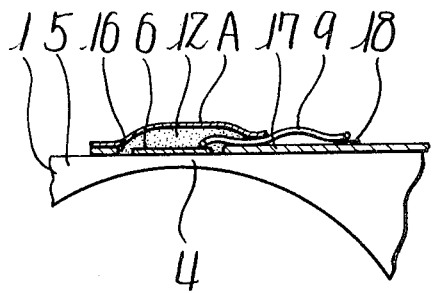
FIG. 12 is a longitudinal sectional view of the sixth embodiment shown in FIG. 10.

FIGS. 10 to 12 show a sixth embodiment of the invention in which a butyl rubber sheet 17 having two clearance ports 16 for holding two strain gauges 6 is adhered to each arm 5 having two strain gauges, after a primer treatment. Then, using a weather strip sealer 12 as a rubber adhesive, a thin butyl rubber sheet 14 is adhered to the butyl rubber sheet 17 thereby to form a coating A. A copper foil section 18 which constitutes the terminal for the lead wires 9 is formed at the mid portion of the butyl rubber sheet 17.

The weather strip sealer 12 can also be substituted for a liquid of unvulcanized butyl rubber in this embodiment. Needless to say, in such a case, the liquid rubber is vulcanized under the presence of pressure and heat.

Thus, there are two major requirements for the protection of strain gauges of load cell, namely prevention of permeation of moisture and no affect on the deflection of flexible portions and strain gauges. The silicon rubber coating which is now used most commonly can provide only a small effect of prevention of moisture permeation.

Figure 13:
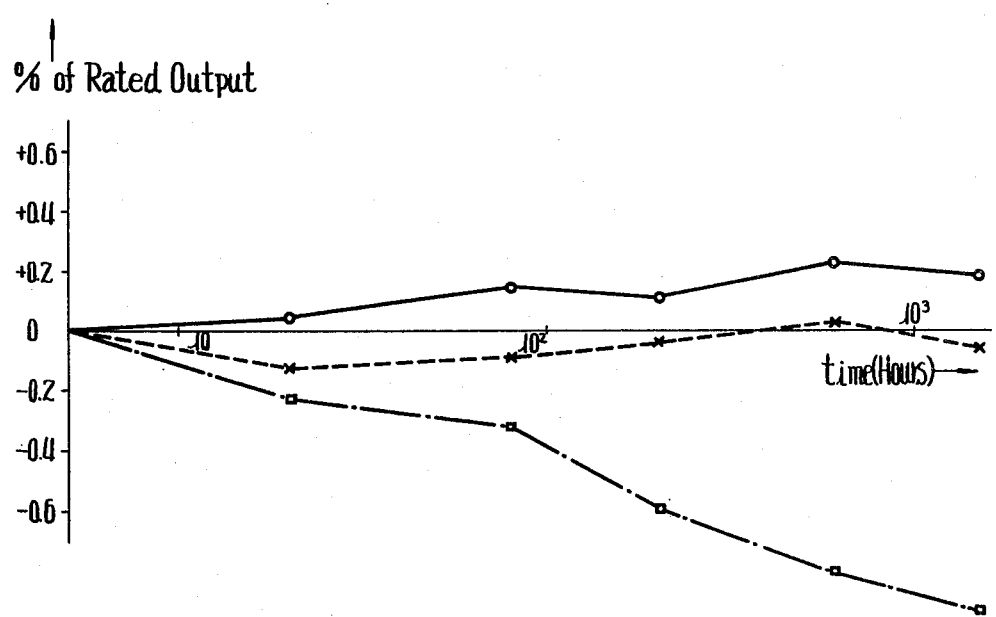
FIG. 13 shows secular change of output characteristic of the load-cell balance obtained with various coating materials.

As the moisture is permeated to the strain gauge, the resistance value of the strain gauge is changed and the base material of the strain gauge exhibits a swell resulting in a further change of the resistance of strain gauge, to cause a change of zero balance. It is possible to evaluate the effect of moisture proofing by measuring the change of zero balance. FIG. 13 shows the result of a test conducted from this point of view. The test was carried out under the conditions of 40° C. temperature and 95% moisture. In FIG. 13, axis of abscissa represents the time, whereas the axis of coordinate represents the rate of change of output. Marks o, x and □ show, respectively, the characteristics observed with the use of butyl rubber sheet coating, butyl rubber liquid coating and silicon rubber coating. From FIG. 13, it will be understood that the silicon rubber coating causes an extremely large change of output, while only a small change is observed when the coating is formed by adhesion of butyl rubber sheet and butyl rubber liquid. This means that the butyl rubber sheet and the butyl rubber liquid provide superior moisture prevention effect over the conventional coating made of silicon rubber.

It is also to be noted that the materials of butyl rubber group exhibits such a secular change that the hardness decreases gradually. This characteristic, confirmed through experiments, is quite advantageous when such material is used for coating and sealing the strain gauges of the load cell.

What is claimed as new and desired to be secured by Letters Patent of the United States is:

1. A load-cell balance comprising: a load cell body having a parallelogram form constituted by a stationary column, a movable column holding a load support and two arms through which said stationary and movable columns are connected to each other at their upper and lower ends, each of said arms having thin-walled flexible portions; strain gauges including lead wires, said strain gauges being adhered to said flexible portions; a spacer made of a material of a butyl rubber group and interposed between said lead wires of each strain gauge and a corresponding flexible portion and a coating of a material of butyl rubber group adapted to coat and seal said spacer and said strain gauge.

2. A load-cell balance comprising: a load cell body having a parallelogram form constituted by a stationary column, a movable column holding a load support and two arms through which said stationary and movable columns are connected to each other at their upper and lower ends, each of said arms having thin-walled flexible portions; strain gauges including lead wires, said strain gauges being adhered to said flexible portions; a spacer made of a material of a butyl rubber group and interposed between said lead wires of each strain gauge and corresponding flexible portions; and a coating for coating said spacer and said strain gauge, said coating being formed by adhering a butyl rubber sheet of a size large enough to cover said spacer and said strain gauge by applying an unvulcanized butyl rubber liquid on said flexible portion and then bonding said butyl rubber liquid to said flexible portion by effecting in situ heating and vulcanization of said butyl rubber liquid.

3. A load-cell balance comprising: a load cell body having a parallelogram form constituted by a stationary column, movable column holding a load support and two arms through which said stationary and movable columns are connected to each other at their upper and lower ends, each of said arms having thin-walled flexible portions; strain gauges including lead wires, said strain gauges being adhered to said flexible portions; and a coating for each strain gauge, said coating being formed by superposing a frame-like butyl rubber sheet surrounding said strain gauge and extending between said lead wires and said flexible portions, and a thin butyl rubber sheet having an outer periphery conforming to that of said frame-like rubber sheet and being adhered thereto by a rubber adhesive.

4. The balance of claim 3 wherein said frame-like butyl rubber sheet is adapted to individually surround at least two said strain gauges on each said arm.

5. A load-cell balance comprising: a load cell body having a parallelogram form constituted by a stationary column, a movable column holding a load support and two arms through which said movable and stationary columns being connected to each other at their upper and lower ends, each of said arms having thin-walled flexible portions; strain gauges including lead wires, said strain gauges being adhered to said flexible portions; and a coating for each of said strain gauges, said coating being formed by adhering, using an unvulcanized butyl rubber liquid, a frame-like butyl rubber sheet surrounding said strain gauge and extending between said flexible portions and said lead wires and a thin butyl rubber sheet having a periphery conforming to that of said frame-like butyl rubber sheet, said butyl rubber liquid having been vulcanized in situ by heating and pressurizing thereby to bond said sheets to each other.

* * * * *